United States Patent
Kido

(10) Patent No.: US 8,363,260 B2
(45) Date of Patent: Jan. 29, 2013

(54) IMAGE PROCESSING APPARATUS AND IMAGE PROCESSING METHOD

(75) Inventor: Hideyuki Kido, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 12/478,469

(22) Filed: Jun. 4, 2009

(65) Prior Publication Data

US 2009/0303544 A1 Dec. 10, 2009

(30) Foreign Application Priority Data

Jun. 6, 2008 (JP) .................................. 2008-149363

(51) Int. Cl.
 G06K 15/00 (2006.01)
 G06F 15/00 (2006.01)
 H04N 1/40 (2006.01)
(52) U.S. Cl. ......... 358/1.18; 358/3.28; 358/1.9; 358/2.1
(58) Field of Classification Search .................. 707/775; 715/201; 358/1.15, 540, 537, 532, 520, 521, 358/504, 1.9, 2.1, 3.28; 382/166, 167, 163, 382/165
 See application file for complete search history.

(56) References Cited

U.S. PATENT DOCUMENTS

| | | | |
|---|---|---|---|
| 6,005,972 A * | 12/1999 | Fredlund et al. | 382/176 |
| 2005/0088698 A1 | 4/2005 | Matama | |
| 2005/0213174 A1 | 9/2005 | Maki et al. | |
| 2006/0170968 A1 * | 8/2006 | Maki et al. | 358/1.15 |
| 2007/0076980 A1 | 4/2007 | Maeda et al. | |
| 2012/0066258 A1 * | 3/2012 | Audet | 707/775 |
| 2012/0075648 A1 * | 3/2012 | Keys et al. | 358/1.11 |

FOREIGN PATENT DOCUMENTS

| | | |
|---|---|---|
| EP | 1884895 A1 | 2/2008 |
| JP | 2000-295565 A | 10/2000 |
| JP | 2000-295565 A | 10/2000 |
| JP | 2003-244581 A | 8/2003 |
| JP | 2007-006250 A | 1/2007 |
| JP | 2007-104131 A | 4/2007 |
| JP | 2007-124617 A | 5/2007 |

* cited by examiner

*Primary Examiner* — Jerome Grant, II
(74) *Attorney, Agent, or Firm* — Canon USA Inc. IP Division

(57) ABSTRACT

An image processing apparatus causes a composite image to be printed, on a recording sheet, as an entry area to be written in by a user. The composite image is formed by superimposing a fixed image on a reference image. The image processing apparatus extracts an image of an area having luminance lower than a predetermined threshold value from an image corresponding to the entry area contained in an image obtained by reading the recording sheet having the entry area that is written in, and the image processing apparatus uses mask data for extracting an image of an area corresponding to the fixed image to perform image extraction.

10 Claims, 12 Drawing Sheets

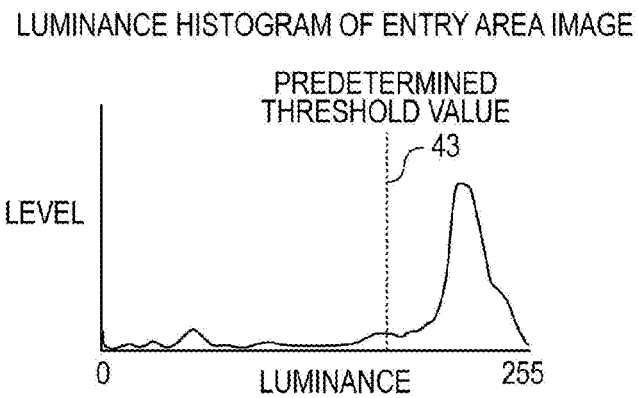
FIG. 9A
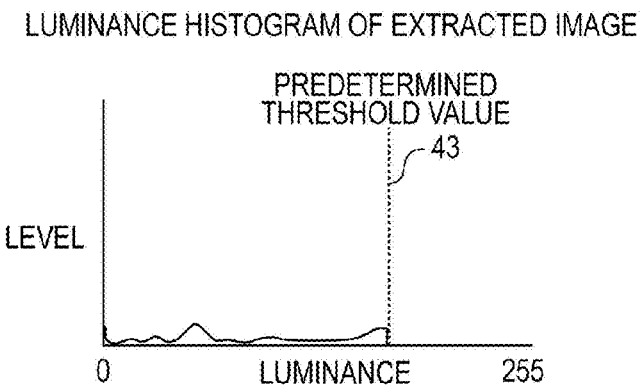
FIG. 9B
FIG. 9C
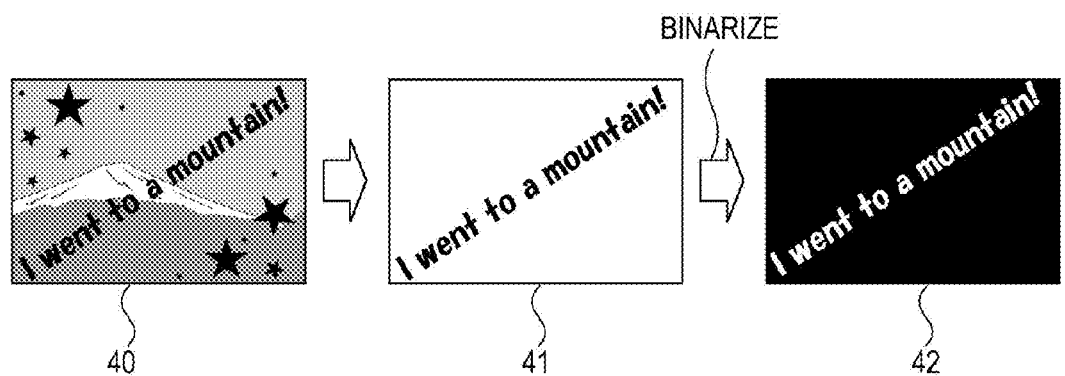

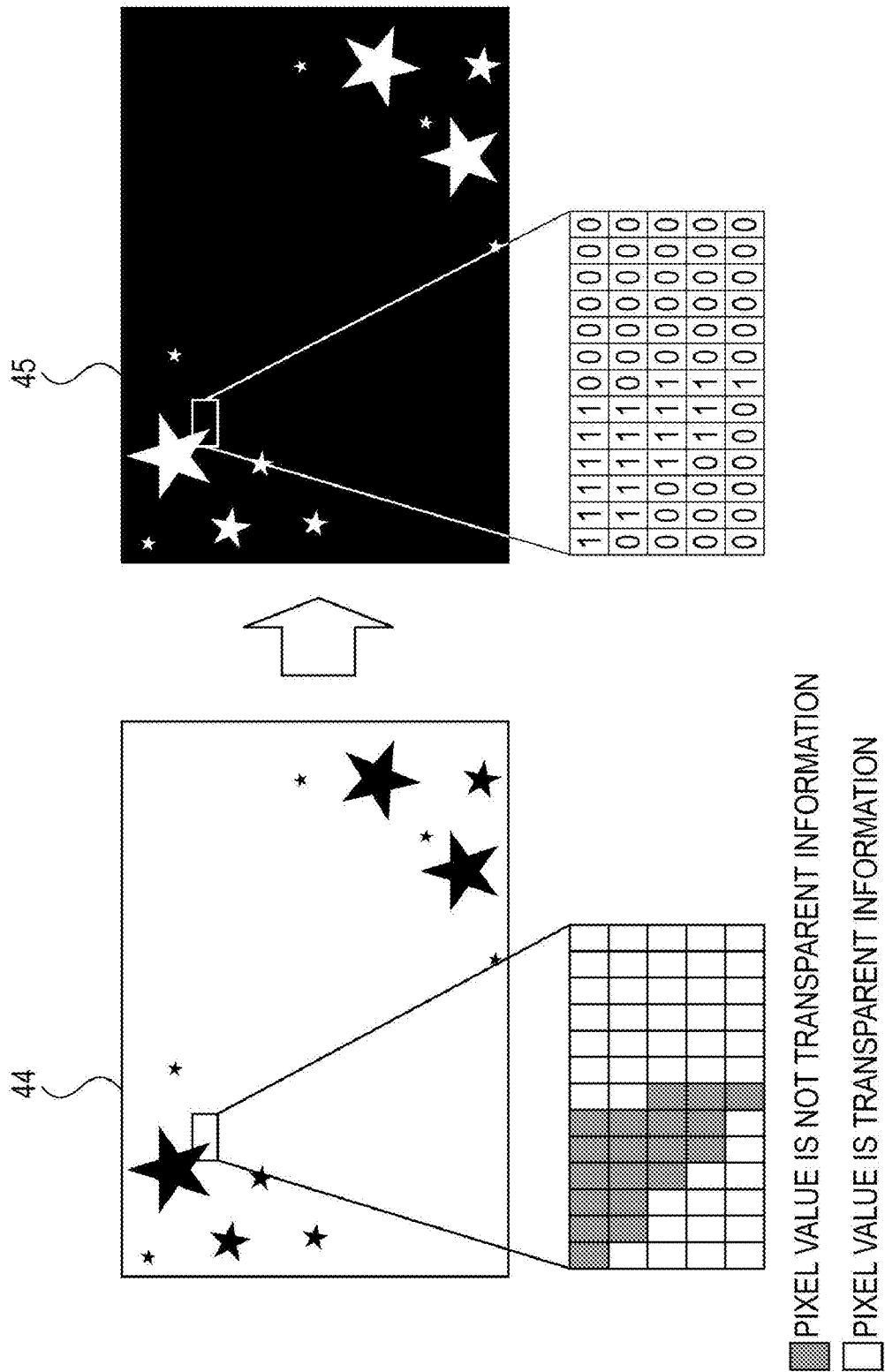

FIG. 14
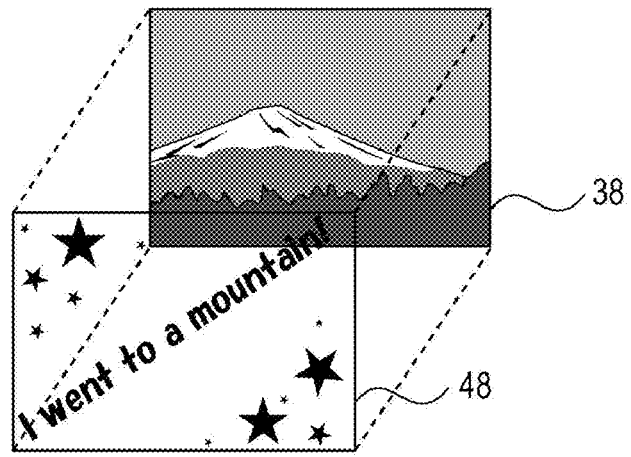
FIG. 15
EXAMPLE OF COMPOSITE IMAGE PRINTED IN FULL-PAGE LAYOUT
EXAMPLE OF COMPOSITE IMAGE PRINTED IN HALF-PAGE LAYOUT
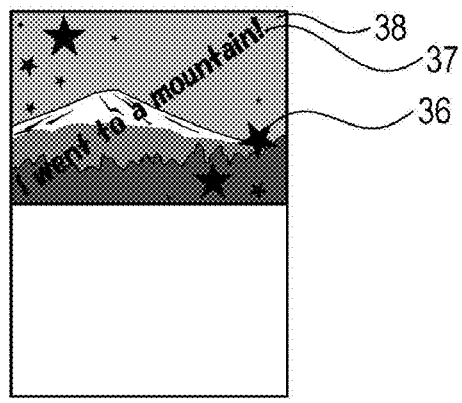

IMAGE PROCESSING APPARATUS AND IMAGE PROCESSING METHOD

BACKGROUND OF THE INVENTION

1. Field of the Invention

The present invention relates to image processing apparatuses and image processing methods for combining an image input from an image input unit and a handwritten image corresponding to content entered by a user. In particular, the present invention relates to an image processing apparatus and an image processing method for combining a handwritten image and a fixed image, which may be a predetermined digital image data, with a background image.

2. Description of the Related Art

In recent years, with the spread and sophistication of apparatuses such as digital cameras, scanners, and printers, there have been proposed techniques in which a digital photo image is not only printed on a recording sheet but is also used in various ways.

Examples of such techniques include a processing technique for allowing handwritten text and drawings to be written in a photo image, and a combining technique for combining digital image data, such as an illustration image, with a photo image. With these techniques, it is possible, for example, to write a message in a photo image taken by a digital camera and create a postcard combined with a decorative frame.

Several methods have been proposed as techniques for combining handwritten text and drawings with a photo image input from an image input apparatus, such as a digital camera or a scanner.

US Patent Application Publication No. 2005/0213174 describes a technique where a handwriting sheet on which an illustration image which serves as an entry sample is combined with a photo image, and is printed. After the user enters text and drawings in an entry area of the printed handwriting sheet, the handwriting sheet is read, and an image corresponding to the handwritten text and drawings (hereinafter referred to as a "handwritten image") is combined with the photo image.

The above document further describes a method in which the photo image is printed within the entry area of the handwriting sheet, so that the user can see where the entered text and drawings are to be positioned in the photo image. To read the handwriting sheet generated by this method, it may be necessary to distinguish the handwritten image from a printed background image so as to extract the handwritten text and drawings. Therefore, the background image is printed lightly and a threshold value of luminance is set for reading the handwriting sheet. Then, in the read image, a portion having luminance lower than the threshold value is determined to be a portion handwritten by the user.

As a method for combining an illustration image, Japanese Patent Laid-Open No. 2000-295565 describes a method in which a frame image recorded in a recording medium, such as a memory card, is read out and combined with a photo image to decorate it, which is then printed.

With the known techniques described above, an illustration image may be combined with a photo image to form a composite image, and a handwritten image entered by the user may be combined with the composite image. To allow the user to enter a handwritten image while checking the resulting composite image, it is possible to print, using the above-described method, an illustration image and a lightly-printed background image (hereinafter referred to as a "reference image") in an entry area of a handwriting sheet.

To read this handwriting sheet, an image of an area where the illustration image is printed may need to be extracted separately from the reference image, as in the case of the handwritten image. However, if a portion of the illustration image has a luminance higher than a threshold value, an image of this portion may not be extracted during reading. This may cause a problem in that the resulting printed illustration may be partially missing. Therefore, the illustration image may need to have luminance lower than the set threshold value. This means that high-luminance colors typically cannot be used for illustration images.

SUMMARY OF THE INVENTION

According to one aspect of the invention, an image processing apparatus is provided that outputs an image formed by combining a background image and an area extracted from an image obtained by reading a recording sheet. The image processing apparatus includes a printing unit configured to print an image on a recording sheet, a reading unit configured to read a recording sheet, a converting unit configured to convert the background image into a reference image having the same content as that of the background image but having luminance higher than that of the background image, a print control unit configured to cause the printing unit to print, on a recording sheet, a first image as an entry area to be written in by a user, the first image being a composite image formed by superimposing a fixed image on the reference image obtained by the converting unit, an extracting unit configured to extract, from a second image, an image of an area having luminance lower than a predetermined threshold value, the second image corresponding to the entry area contained in an image obtained when the reading unit reads the recording sheet having the entry area that is written in, an obtaining unit configured to obtain mask data for extracting an image of an area corresponding to the fixed image, and an output unit configured to output a composite image formed by superimposing, on the background image, the image extracted from the second image on the basis of the extracting unit and the mask data obtained by the obtaining unit.

Further features of the present invention will become apparent from the following description of exemplary embodiments with reference to the attached drawings.

BRIEF DESCRIPTION OF THE DRAWINGS

FIG. 9A to FIG. 9C illustrate an example of generation of handwritten-image mask data.

FIG. 10 illustrates an example of processing (step S107 in FIG. 4) for generating illustration-image mask data from digital image data of an illustration image.

FIG. 14 illustrates an example of processing for generating a resulting composite image.

FIG. 15 illustrates examples of a printed resulting composite image.

DESCRIPTION OF THE EXEMPLARY EMBODIMENTS

Figure 1:
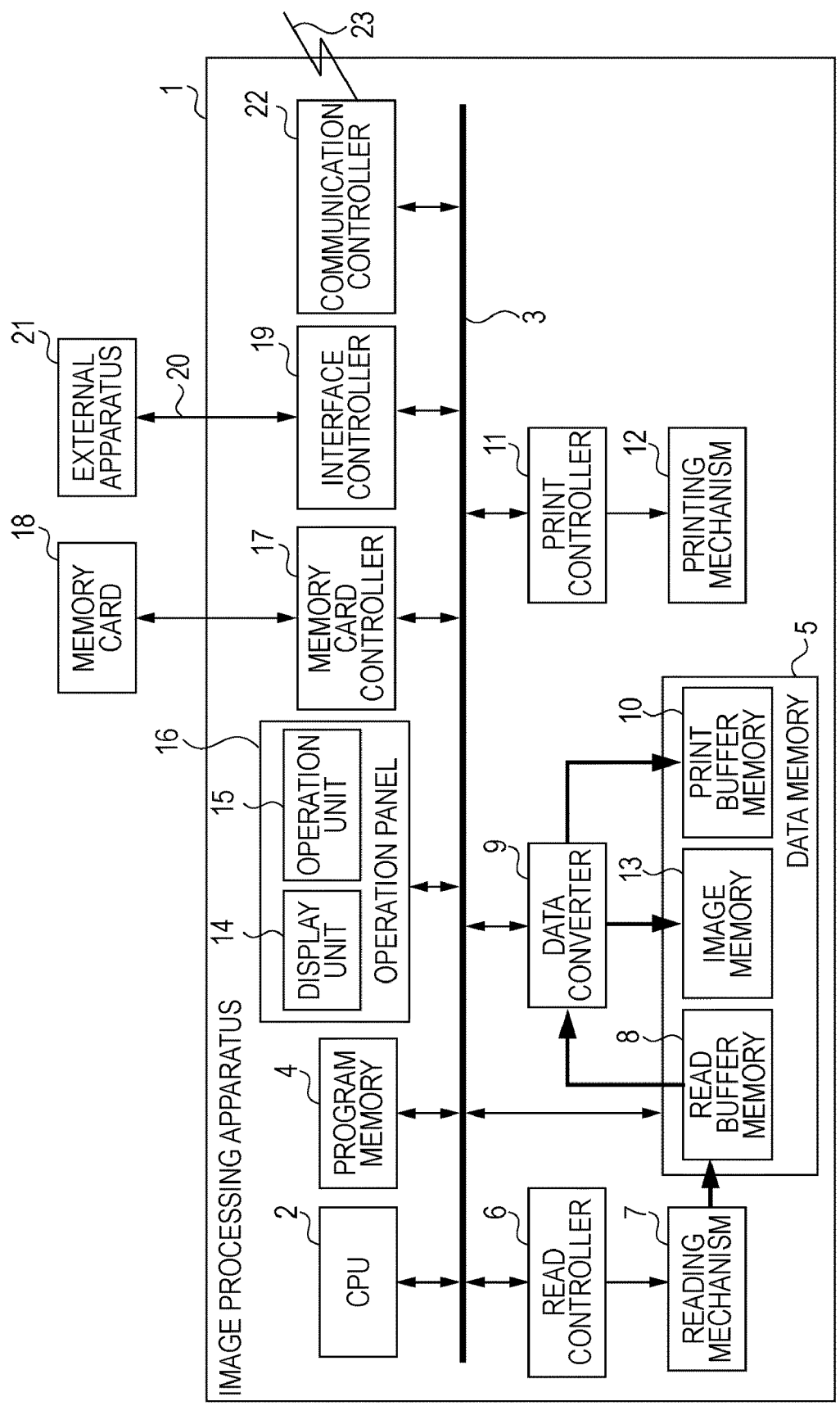
FIG. 1 is a block diagram illustrating a configuration of an image processing apparatus according to an exemplary embodiment of the present invention.

FIG. 1 is a block diagram illustrating a configuration of an image processing apparatus 1 according to an exemplary embodiment of the present invention.

According to this embodiment, a central processing unit (CPU) 2, which is a microprocessor, operates in accordance with a control program stored in a program memory 4 and content of a data memory 5, which is a random-access memory (RAM). The program memory 4 and the data memory 5 are connected to the CPU 2 via an internal bus 3. Processing described below can be realized, for example, when the CPU 2 executes the control program having computer-executable instructions stored in a computer-readable recording medium, such as the program memory 4.

The CPU 2 operates a reading mechanism 7, which serves as a reading unit, through a read controller 6. The CPU 2 stores, in a read buffer memory 8 in the data memory 5, original image data read by an image sensor (not shown) included in the reading mechanism 7.

The original image data stored in the read buffer memory 8 is read out and converted into print data by a data converter 9, and is stored in a print buffer memory 10 in the data memory 5. The CPU 2 operates a printing mechanism 12, which serves as a printing unit, through a print controller 11. At the same time, the CPU 2 reads out the print data stored in the print buffer memory 10 and transmits the print data to the printing mechanism 12, which prints the print data on a recording sheet. A copy operation may thus be realized.

The data memory 5 includes an image memory 13, in which the original image data read by the reading mechanism 7 and various kinds of image data can be temporarily stored and edited. The data converter 9 reads out the image data stored in the image memory 13 and converts the read-out image data into print data. Printing of photo images and others, as well as a copy operation, can thus be realized.

Under control of the CPU 2, the allocation of capacity among the read buffer memory 8, print buffer memory 10, and image memory 13 in the data memory 5 can be dynamically changed according to the operating states, such as operation mode and user settings.

The data converter 9 is also capable of performing image processing, such as image analysis, generation of thumbnails, correction of thumbnails, and correction of output images.

Along with the control program for controlling the CPU 2, fixed image data to be combined may be stored in the program memory 4 in advance. Examples of the fixed image data include illustration image data for decorating a photo image, etc.

The image processing apparatus 1 includes an operation panel 16 having a display unit 14, such as a light-emitting diode (LED) display or a liquid crystal display (LCD), and an operation unit 15 with various keys. The operation panel 16 allows an operator to perform various input operations and displays operating states.

A memory card controller 17 controls access to a memory card 18, which is a recording medium, and reads and writes data, such as image data, stored in the memory card 18. Thus, photo image data stored in the memory card 18 may be read out, stored in the image memory 13, converted into print data, and printed.

An interface controller 19 controls communication through an interface 20. The interface controller 19 transmits and receives data to and from an external apparatus 21 externally connected to the image processing apparatus 1. Examples of the external apparatus 21 include a personal computer (PC). The image processing apparatus 1 is connected to the PC, receives print data generated by a printer driver running on the PC, and prints the print data. A digital camera or the like may be connected to the image processing apparatus 1, so that photo image data can be read out, stored in the image memory 13, converted into print data, and printed.

A communication controller 22 includes a modulator-demodulator (MODEM) and a network control unit (NCU). The communication controller 22 is connected to an analog communication line 23 and performs line control, such as call-out and call-in control, on the communication line 23.

Figure 3:
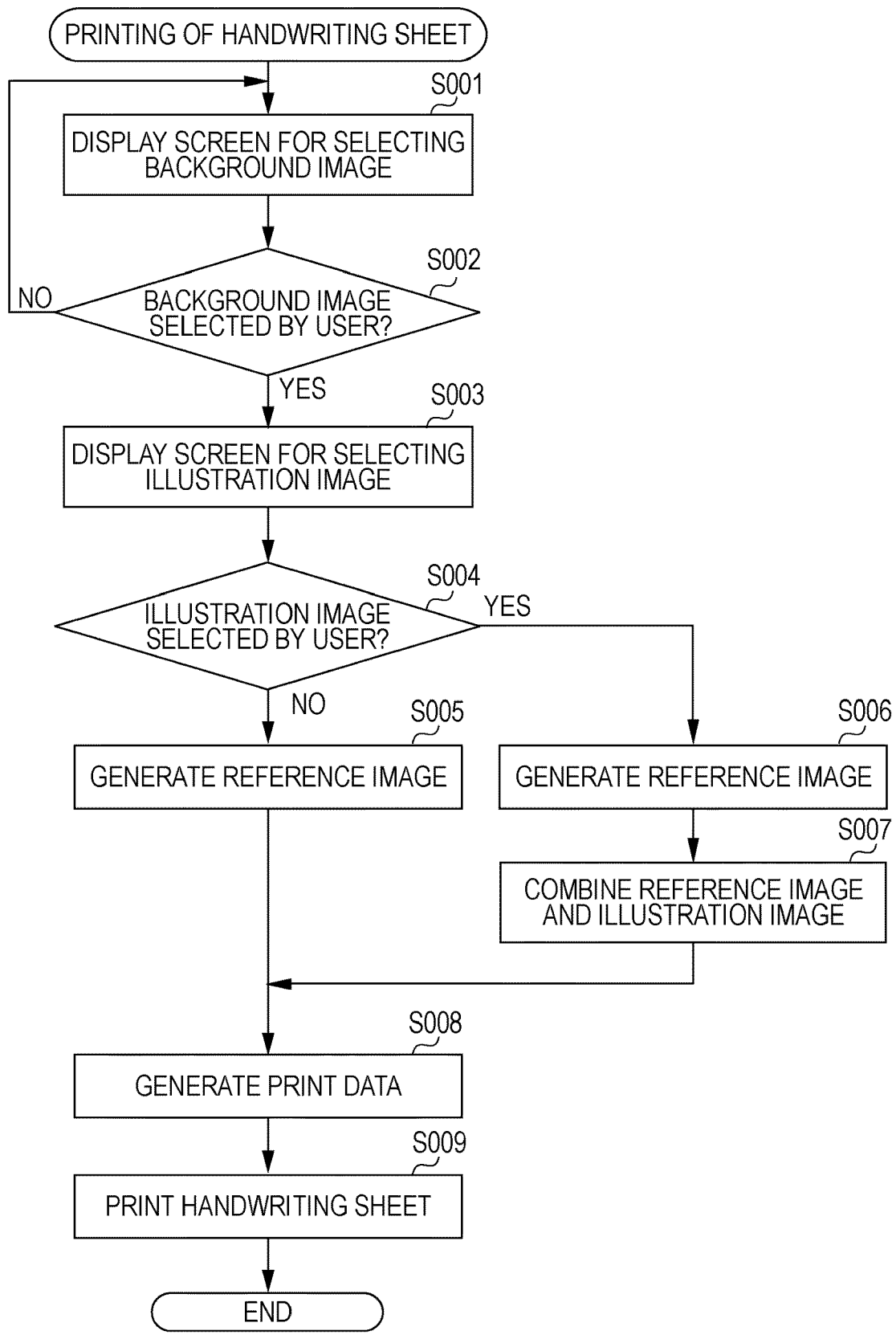
FIG. 3 is a flowchart illustrating an example of a processing procedure for printing a handwriting sheet.

FIG. 3 is a flowchart illustrating an example of a processing procedure for printing a handwriting sheet. This processing may be executed by the CPU 2 of the image processing apparatus 1, for example when the user selects "Printing of Handwriting Sheet" from a menu displayed on the operation panel 16.

In step S001, an image data file of background images stored in the memory card 18 is read. Then, a selection screen which allows the user to select a background image is displayed on the display unit 14. In step S002, it is determined whether a background image has been selected by a user's key operation on the operation unit 15.

If it is determined that a background image has been selected (YES in step S002), the processing proceeds to step S003. In step S003, an image data file of illustration images stored in the program memory 4 is read and displayed on the display unit 14. By a key operation on the operation unit 15, the user can determine whether an illustration image is to be combined and can select an illustration image to be combined. The details will be described later on with reference to FIG. 5. If no background image has been selected (NO in step S002), processing returns to step S001.

In step S004, it is determined whether an illustration image to be combined has been selected by the user in step S003.

If it is determined that the user has not selected any illustration image (NO in step S004), the processing proceeds to step S005. In step S005, a reference image is generated on the basis of the background image selected in step S002. Then, the generated reference image is stored in the image memory 13.

Figure 6:
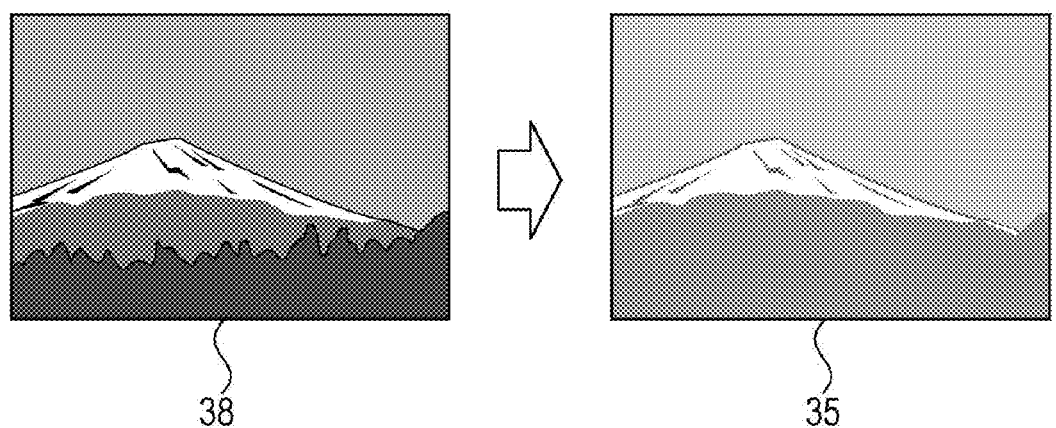
FIG. 6 illustrates an example of a reference image.

A reference image is an image obtained by converting a background image, such as a photo image, so as to increase luminance of the background image. In other words, a reference image is an image obtained by lightening colors of a background image. FIG. 6 illustrates an example of a reference image. A reference image 35 is obtained by converting a background image 38 such that colors of the background image 38 are lightened. The processing for generating a reference image will be described in detail later on.

Referring back to FIG. 3, if it is determined in step S004 that the user has selected an illustration image (YES in step S004), the processing proceeds to step S006, where a reference image is generated in the same manner as that in step S005.

In step S007, the illustration image selected in step S003 and the reference image generated in step S006 are combined to form a composite image.

Figure 7:
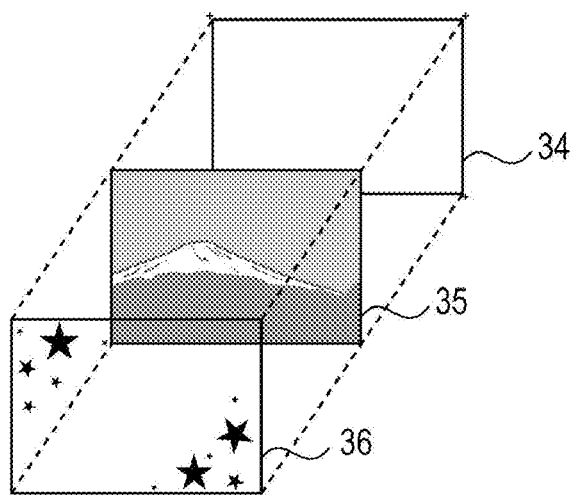
FIG. 7 illustrates an example of processing for combining an illustration image and a reference image.

FIG. 7 illustrates processing for combining an illustration image and a reference image. Here, it is determined whether each pixel data in an illustration image 36 is transparent information. If the pixel data is not transparent information, the corresponding pixel data in the reference image 35 is used.

In step S008 of FIG. 3, print data of the reference image obtained in step S005 or print data of the composite image obtained in step S007 is generated. Along with this print data, print data of a setting area for the user to make various settings and print data of a barcode indicating other settings are generated. For example, the barcode contains information indicating a destination where the background image selected by the user in step S002 is recorded, information as to whether the user has selected in step S004 an illustration image is to be combined, and the type of illustration image to be combined.

Then, in step S009, the printing mechanism 12 is controlled such that a handwriting sheet is printed on the basis of the print data generated in step S008.

Figure 5:
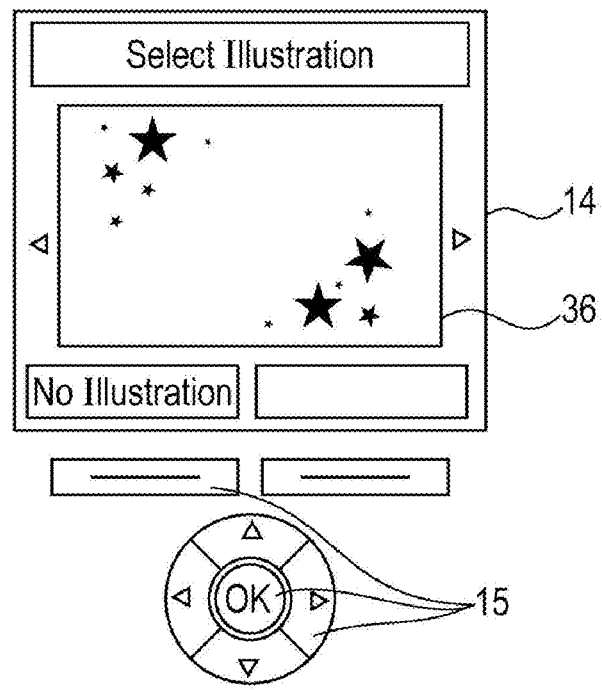
FIG. 5 illustrates an example of an illustration-image selection screen displayed in step S003 of FIG. 3.

FIG. 5 illustrates an example of an illustration-image selection screen displayed in step S003 of FIG. 3.

The illustration image 36 stored in the program memory 4 is read out and displayed on the display unit 14. The user can change the illustration image 36 on the display unit 14 by pressing direction keys of the operation unit 15. If an OK key of the operation unit 15 is pressed while the illustration image 36 is displayed, it is determined in step S004 of FIG. 3 that the displayed illustration image 36 has been selected. On the other hand, if "No Illustration" on the display unit 14 is selected and the OK key is pressed, it is determined in step S004 of FIG. 3 that no illustration image is to be combined.

Next, processing for generating a reference image from an illustration image (step S005 and step S006 of FIG. 3) will be described in detail. If the user selects a background image in step S002 of FIG. 3, a data file of the selected background image is stored in the image memory 13.

This processing first involves obtaining luminance data (Rorg, Gorg, and Borg) of the background image stored in the image memory 13. Each of Rorg, Gorg, and Borg is luminance data having a value from 0 to 255.

Then, gradation conversion is performed using the following equations (1) to (3) to obtain pixel data (Rref, Gref, and Bref) of a reference image:

$$R\text{ref}=(255-R\text{miN})+((R\text{org}/255)*R\text{miN}) \quad (1)$$

$$G\text{ref}=(255-G\text{miN})+((G\text{org}/255)*G\text{miN}) \quad (2)$$

$$B\text{ref}=(255-B\text{miN})+((B\text{org}/255)*B\text{miN}) \quad (3)$$

By performing this processing for every pixel data of the background image 38, a reference image having luminance limited to a value greater than or equal to (RmiN, GmiN, and BmiN) can be generated.

Figure 2:
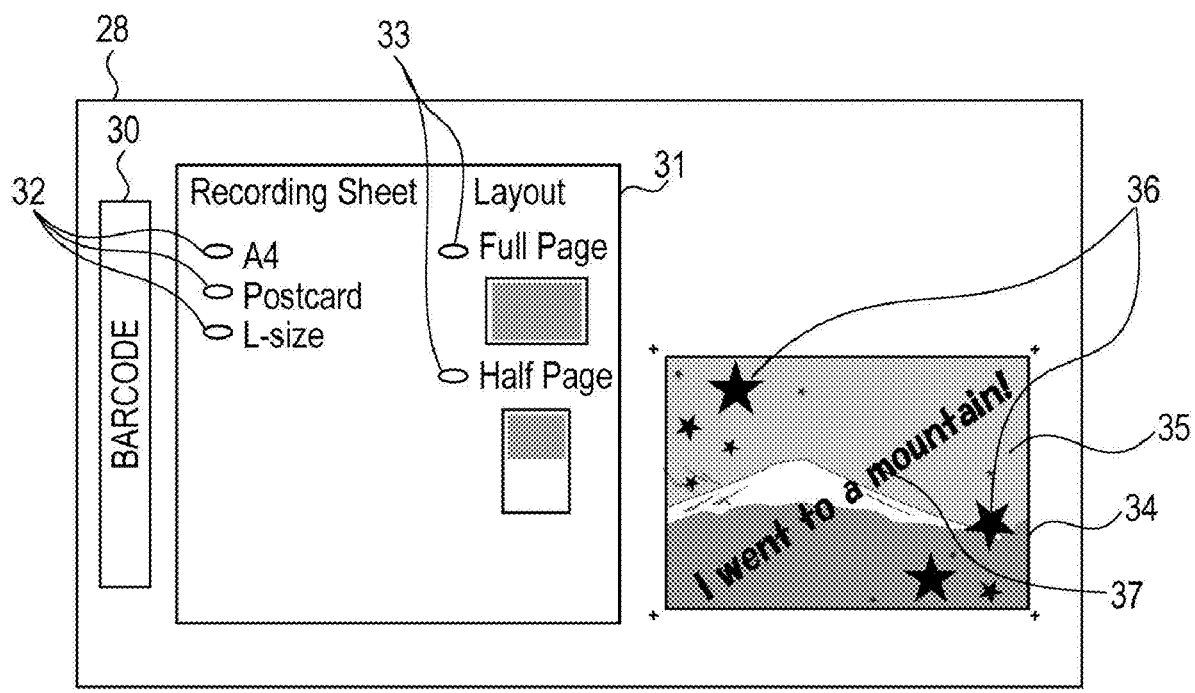
FIG. 2 illustrates an example of a handwriting sheet according to an exemplary embodiment of the present invention.

FIG. 2 illustrates an example of a handwriting sheet according to an exemplary embodiment of the present invention. The handwriting sheet may be printed in accordance with the flowchart of FIG. 3.

A handwriting sheet 28 has a barcode 30 containing, as described above, information indicating a destination where a background image is recorded, information as to whether an illustration image is to be combined, and the type of illustration image to be combined.

A setting area 31 is positioned to the right of the barcode 30 on the handwriting sheet 28. By filling in ovals in the setting area 31, the user can specify settings for printing. In FIG. 2, by filling in one of sheet-size selection ovals 32 within the setting area 31, the user can select a size of a recording sheet for printing. Similarly, by filling in one of layout selection ovals 33, the user can select a layout of the recording sheet for printing.

An entry area 34 is an area where the user enters text and drawings to be combined with a background image. Text 37 in the entry area 34 is written by the user. Such text and drawings entered in the entry area 34 form a handwritten image. A composite image formed by combining the reference image 35 and the illustration image 36 in step S007 of FIG. 3 is printed in the entry area 34.

Figure 4:
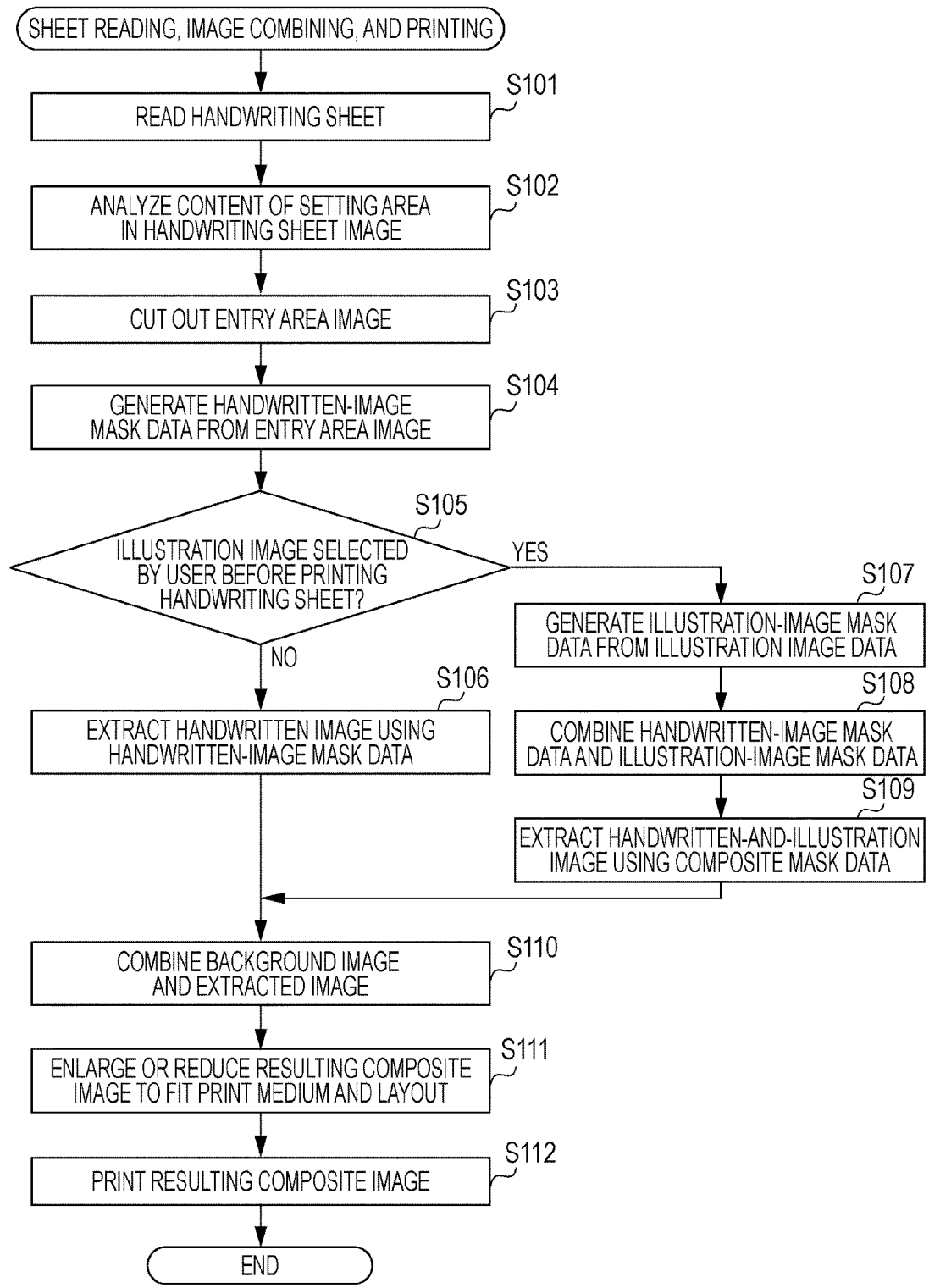
FIG. 4 is a flowchart illustrating an example of a processing procedure in which a handwriting sheet filled in by a user is read, and an image formed by combining a background image, an illustration image, and a handwritten image is printed.

FIG. 4 is a flowchart illustrating an example of a processing procedure in which a handwriting sheet filled in by the user is read, and an image formed by combining a background image, an illustration image, and a handwritten image is printed. The processing example illustrated in FIG. 4 may be executed by the CPU 2 of the image processing apparatus 1 when the user selects, for example, "Sheet Reading, Image Combining, and Printing" from a menu displayed on the operation panel 16.

In step S101, a handwriting sheet is read by controlling the reading mechanism 7. The read image is stored in the read buffer memory 8 as a handwriting sheet image.

In step S102, the handwriting sheet image obtained in step S101 is analyzed, so that information about printing is obtained.

For example, the barcode 30 illustrated in FIG. 2 may be cut out of the read handwriting sheet image and analyzed. Thus, information about a recording sheet on which a background image selected by the user is recorded, and the type of an illustration image, may be obtained. Also, the setting area 31 illustrated in FIG. 2 may be cut out and a filled-in state of the sheet-size selection ovals 32 is analyzed, so that information about a selected sheet size is obtained. Additionally, a filled-in state of the layout selection ovals 33 may be analyzed, so that information about a selected print layout can be obtained.

In step S103, an image (entry area image) corresponding to the entry area 34 illustrated in FIG. 2 is cut out of the handwriting sheet image obtained in step S101. The details will be described later on with reference to FIG. 8.

In step S104, handwritten-image mask data for extracting a handwritten image from the entry area image is generated. The details will be described later on with reference to FIG. 9A to FIG. 9C.

In step S105, on the basis of the analysis of the barcode 30 in step S102, it is determined whether the user has selected an illustration image in the processing (see FIG. 3) for printing a handwriting sheet.

If it is determined that no illustration image has been selected (NO in step S105), the processing proceeds to step S106. In step S106, a handwritten image is extracted from the entry area image using the handwritten-image mask data generated in step S104.

On the other hand, if it is determined in step S105 that an illustration image has been selected (YES in step S105), the processing proceeds to step S107. In step S107, illustration-image mask data is generated from digital image data of the illustration image selected by the user in the processing (see FIG. 3) for printing a handwriting sheet. The details of the processing in step S107 will be described later on with reference to FIG. 10.

In step S108, the handwritten-image mask data generated in step S104 and the illustration-image mask data generated in step S107 are combined to form composite mask data.

In step S109, an image is extracted from the entry area image using the composite mask data obtained in step S108.

In step S110, the background image selected by the user in step S002 of FIG. 3 is read out from the memory card 18 and combined with the image extracted in step S106 or S109 to form an image (hereinafter referred to as a "resulting composite image"). This will be described with reference to FIG. 14.

FIG. 14 illustrates an example of processing for generating a resulting composite image. For a pixel determined to correspond to a handwritten portion or an illustration portion, pixel data of the image extracted in step S109 is used. For a pixel determined not to correspond to either a handwritten portion or an illustration portion, that is, for a pixel determined to correspond to a background portion, pixel data of the selected background image 38 is used. Thus, a resulting composite image combining a background image, an illustration image, and a handwritten image is generated.

Referring back to FIG. 4, in step S111, the resulting composite image is enlarged or reduced on the basis of the information about the selected sheet size and layout obtained in step S102. Then, in step S112, the resulting composite image enlarged or reduced in step S111 is printed on a recording sheet by controlling the printing mechanism 12. FIG. 15 illustrates examples of a printed resulting composite image. As illustrated, the resulting composite image can be printed in various layouts.

A description will now be given about the processing (step S104 in FIG. 4) performed to generate handwritten-image mask data from the entry area image.

According to an embodiment, the CPU 2 obtains luminance data (RScaN, GScaN, and BScaN) of each pixel of the entry area image to determine whether the luminance data of each pixel is greater than a predetermined threshold value (Rth, Gth, and Bth). That is, the CPU 2 determines whether all the following inequalities (4) to (6) hold true:

$$RScaN > Rth \quad (4)$$

$$GScaN > Gth \quad (5)$$

$$BScaN > Bth \quad (6)$$

If all the above inequalities (4) to (6) hold true, the CPU 2 determines that the luminance of a pixel of interest in the entry area image is greater than a predetermined level and the pixel of interest corresponds to a background portion. On the other hand, if any of the above inequalities (4) to (6) does not hold true, the CPU 2 determines that the luminance of the pixel of interest is less than or equal to the predetermined level and the pixel of interest corresponds to a handwritten portion.

Here, a determination as to whether luminance is greater than a predetermined value is made on the basis of luminance data of RGB format. However, this determination may be made with reference to a threshold value provided for luminance data obtained by conversion to YUV format or the like.

Figure 8:
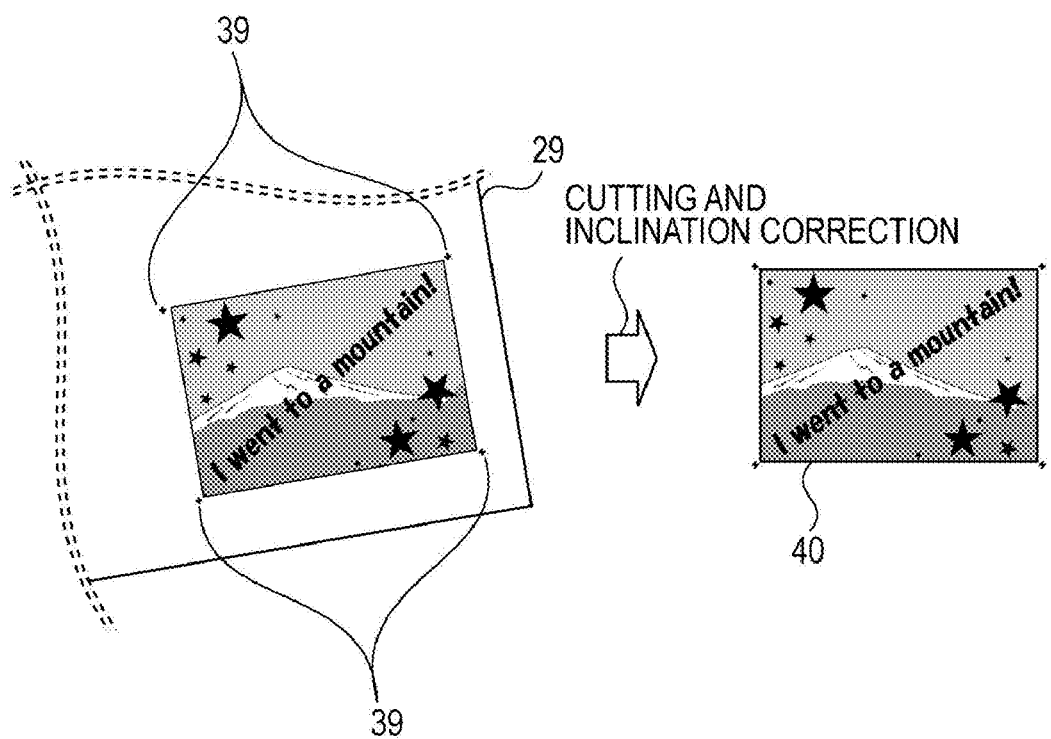
FIG. 8 illustrates example processing (step S103 in FIG. 4) for cutting out an entry area image.

FIG. 8 illustrates example processing (step S103 in FIG. 4) for cutting out an entry area image.

After a handwriting sheet is read, positional reference marks 39 indicating the position of the entry area 34 within a handwriting sheet image 29 stored in the read buffer memory 8 are detected. The detected positional reference marks 39 allow the CPU 2 to recognize the position and inclination of an entry area image 40 within the handwriting sheet image 29. On the basis of the recognized position and inclination, the CPU 2 performs inclination correction, cuts out the entry area image 40 from the handwriting sheet image 29, and stores the cut-out entry area image 40 in the image memory 13.

FIG. 9A to FIG. 9C illustrate an example of generation of handwritten-image mask data.

FIG. 9A is a luminance histogram of the entry area image 40. A predetermined threshold value 43 is provided in this histogram. Then, as illustrated in FIG. 9B, an area having luminance lower than or equal to the threshold value 43 is extracted to obtain an extracted image 41. Generally, since user's handwriting is done in dark colors, a handwritten area has luminance lower than the threshold value 43. The extraction described above can thus be made.

In the entry area image 40 of FIG. 9C, an illustration image has luminance higher than the threshold value 43 and thus has light colors. Therefore, the illustration image is not extracted in the extracted image 41 of FIG. 9C. However, if the illustration image is of dark colors, the illustration image is extracted as in the case of the handwritten image.

The extracted image 41 is binarized by assigning 1 to information of each extracted area and assigning 0 to information of each non-extracted area, so that handwritten-image mask data 42 is generated.

By using such mask data, an image corresponding to areas in the mask data, each area having information assigned a value of 1, is extracted.

FIG. 10 illustrates example processing (step S107 in FIG. 4) for generating illustration-image mask data from digital image data of an illustration image.

Digital image data 44 of FIG. 10 is digital image data of an illustration image selected by the user. The digital image data 44 is read out of the program memory 4. On the basis of whether luminance data of each pixel of the digital image data 44 is a predetermined value corresponding to transparent information, a determination as to whether each pixel corresponds to transparent information is made.

If a pixel of interest corresponds to transparent information, information corresponding to the pixel of interest is set to 0; whereas if a pixel of interest does not correspond to transparent information, information corresponding to the pixel of interest is set to 1. Binarization is thus performed to generate illustration-image mask data 45.

The illustration-image mask data 45 is enlarged or reduced to the size of a handwritten image area. Alternatively, when an entry area image is cut out in step S103 of FIG. 4, the entry area image may be enlarged or reduced to the size of the illustration-image mask data 45.

Figure 11A:
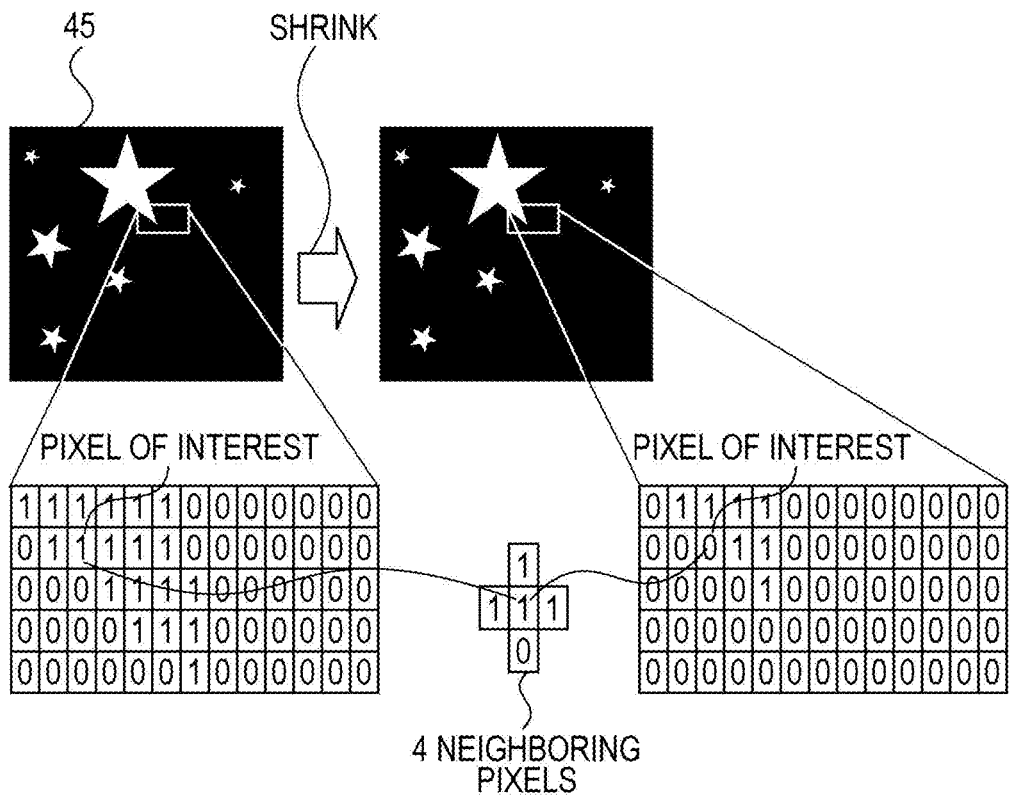
FIG. 11A and FIG. 11B illustrate examples of processing for shrinking illustration-image mask data.
Figure 11B:
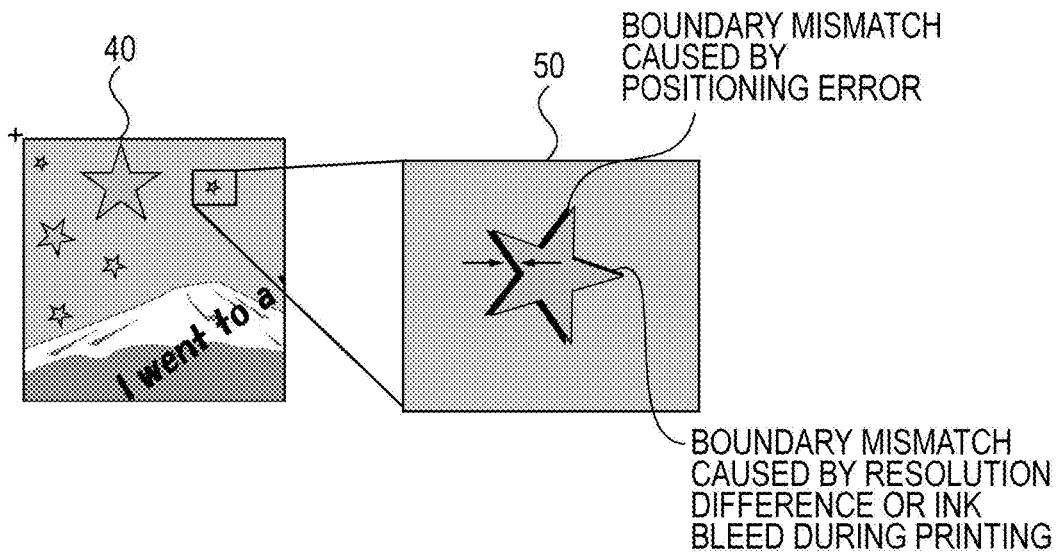

To reduce a boundary mismatch between the entry area image and the illustration-image mask data 45, processing for shrinking the illustration-image mask data 45 may be performed, as illustrated for example in FIG. 11A and FIG. 11B, in the processing of generating the illustration-image mask data 45.

FIG. 11A and FIG. 11B illustrate processing for shrinking illustration-image mask data.

Referring to FIG. 11B, an image 50 is obtained by enlarging an illustration image extracted from the entry area image 40 using the illustration-image mask data 45.

In the entry area image 40, pixels near a boundary between a reference image and an illustration image contain information about both the reference and illustration images. Therefore, depending on the degree of errors, the distinction between these images may become blurry or a boundary mismatch may occur between these images. Also, if ink bleed occurs during printing of a handwriting sheet or the resolutions of these images differ from each other, the boundary between these images may expand or contract, so that the distinction between these images may become blurry. In such cases, like the image 50, it is difficult to properly extract an illustration image.

Therefore, as illustrated in FIG. 11A, illustration-image mask data is shrunk. Specifically, in the illustration-image mask data 45, information of four neighboring pixels of a pixel of interest is examined. If information of at least one of the four neighboring pixels is 0, information of the pixel of interest is set to 0. If information of all the four neighboring pixels is 1, information of the pixel of interest is set to 1. By applying this to the entire illustration-image mask data 45, it is possible to shrink an area where information of pixels is 1, that is, an area for extracting an illustration image.

Alternatively, information of eight neighboring pixels of a pixel of interest may be used to perform shrinking. The amount of shrinkage can be adjusted by increasing or decreasing the number of times the shrinking is performed.

As described above, by shrinking illustration-image mask data, an area to be extracted can be shrunk. Therefore, in the entry area image, it is possible to reduce effects of a blurry boundary and a boundary mismatch between the reference image and the illustration image.

Figure 12:
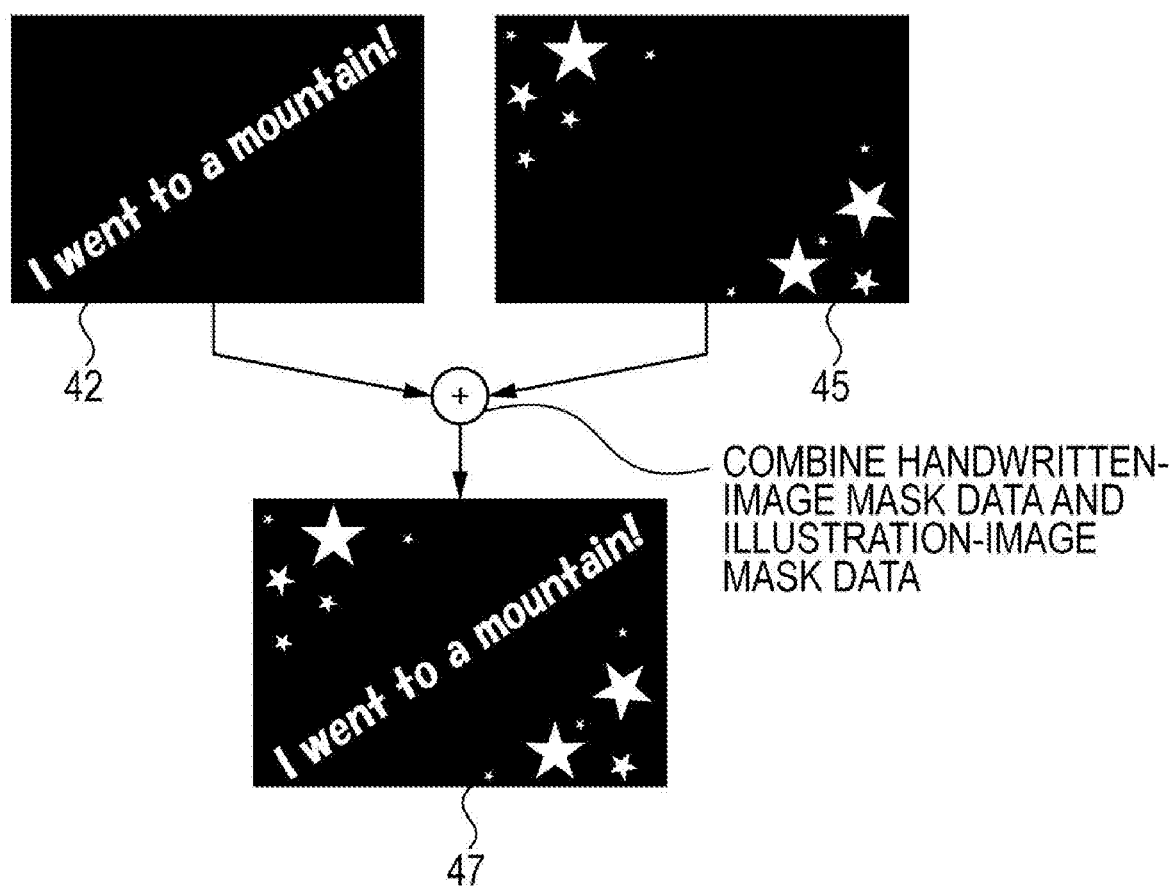
FIG. 12 illustrates example processing (step S108 in FIG. 4) for generating composite mask data by combining handwritten-image mask data and illustration-image mask data.

FIG. 12 illustrates example processing (step S108 in FIG. 4) for generating composite mask data by combining handwritten-image mask data and illustration-image mask data.

If one of the pixels located at the corresponding positions of two pieces of mask data, the handwritten-image mask data 42 and the illustration-image mask data 45, has a value of 1, information corresponding to these pixels at the corresponding positions is set to 1. If pixels located at the corresponding positions of the two pieces of mask data both have a value of 0, information corresponding to these pixels at the corresponding positions is set to 0. Thus, composite mask data 47 is generated.

Figure 13:
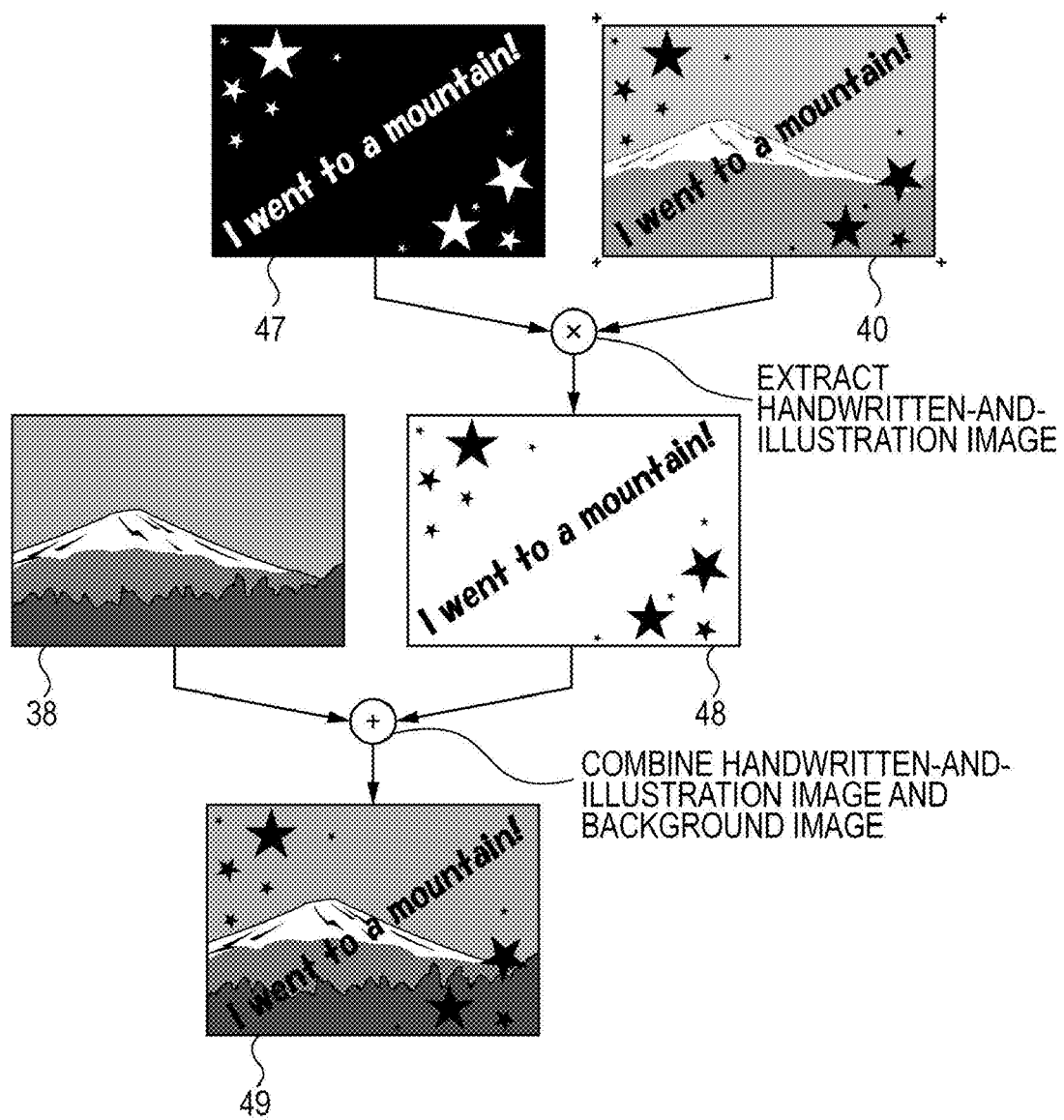
FIG. 13 illustrates an example of processing in which an image is extracted from an entry area image using composite mask data (step S109 in FIG. 4) and the extracted image and a background image are combined (step S110 in FIG. 4).

FIG. 13 illustrates example processing in which an image is extracted from an entry area image using composite mask data (step S109 in FIG. 4) and the extracted image and a background image are combined (step S110 in FIG. 4).

First, an image is extracted from the entry area image 40 using the composite mask data 47.

Specifically, if, in the composite mask data 47, a pixel located at a position corresponding to that of a pixel of interest in the entry area image 40 has a value of 1, the pixel of interest is determined to be pixel information of the entry area image 40; whereas if the above-described pixel in the composite mask data 47 has a value of 0, the pixel of interest in the entry area image 40 is determined to be transparent information of the entry area image 40. Thus, a handwritten-and-illustration image 48 can be extracted from the entry area image 40.

Then, the handwritten-and-illustration image 48 and the background image 38 are combined to form a resulting composite image 49.

The processing of FIG. 13 involves use of the composite mask data 47 formed by combining the handwritten-image mask data 42 and the illustration-image mask data 45. Alternatively, the handwritten-image mask data 42 and the illustration-image mask data 45 may be individually used to perform extraction.

Although combining with the background image 38 is performed after extraction of the handwritten-and-illustration image 48 in FIG. 13, the combining may be performed by the following processing.

That is, to extract an image from the entry area image 40 using the composite mask data 47, if a pixel of interest in the composite mask data 47 has a value of 1, the corresponding pixel in the entry area image 40 is used. On the other hand, if a pixel of interest in the composite mask data 47 has a value of 0, the corresponding pixel in the background image 38 is used. This processing also makes it possible to form the resulting composite image 49.

In the present exemplary embodiment described above, at the time of filling in the handwriting sheet, the user can draw a handwritten image while checking the positional relationship among images to be combined, that is, among a background image, an illustration image, and the handwritten image to be entered.

In the present exemplary embodiment, as described with reference to FIG. 10, mask data for extracting an illustration image is generated from digital image data of the illustration image, separately from mask data for extracting a handwritten image. Thus, regardless of the colors used in the illustration image, the illustration image can be accurately extracted from the entry area image.

Therefore, even when the range of colors used in the illustration image overlaps with the range of colors used in the reference image, it is possible to extract the illustration image.

Aspects of the present invention thus provide an image processing apparatus capable of allowing a user to enter handwritten text and drawings in a handwriting sheet while checking the positional relationship between a background image and a fixed image, and capable of accurately extracting an image of an area corresponding to the fixed image from an image of the handwriting sheet regardless of the colors of the fixed image.

Instead of generating illustration-image mask data as described in the present exemplary embodiment, illustration-image mask data corresponding to an illustration image may be stored in advance in the program memory 4. This may eliminate the need for performing the processing (step S107 in FIG. 4) for generating, from digital image data of the illustration image, illustration-image mask data for extracting the illustration image. Additionally, since it may become unnecessary to hold transparent information in pixel data of the illustration image, the range of colors that can be used in the illustration image can be expanded.

Although an illustration image has been described as an example of a fixed image in the present exemplary embodiment, the present invention is not limited to this. Any fixed image may be used as long as it is generated in advance. Examples of the fixed image may include not only an illustration image, but also a text image.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-149363 filed Jun. 6, 2008, which is hereby incorporated by reference herein in its entirety.

What is claimed is:

1. An image processing apparatus that combines an image stored in a memory, information added by a user on a sheet, and an object printed on the sheet, the image processing apparatus comprising:

a print control unit configured to cause a printing apparatus to print an object stored in a memory, on a sheet;

an inputting unit configured to input a read image obtained by reading the sheet on which the object is printed by the print control unit and information is added by a user;

a specifying unit configured to specify an area, in the read image input by the inputting unit, corresponding to the object to be combined, by using the object stored in the memory;

an extracting unit configured to extract the information from the read image by analyzing the read image, and to extract the object corresponding to the area specified by the specifying unit from the read image; and a combining unit configured to combine the image stored in the memory, the information extracted from the read image by the extracting unit, and the object extracted from the read image by the extracting unit.

2. The image processing apparatus according to claim 1, wherein the extracting unit specifies, in the read image, a first area having luminance lower than a predetermined luminance level, and extracts a first image of the specified first area and a second image of a second area specified by the specifying unit.

3. The image processing apparatus according to claim 1, further comprising a converting unit configured to convert the image stored in the memory into a reference image so that the reference image has luminance higher than that of the image, wherein the print control unit causes the printing apparatus to print the object and the reference image converted by the converting unit.

4. The image processing apparatus according to claim 3, wherein the print control unit causes the printing apparatus to print the object stored in the memory on the reference image, and the extracting unit extracts the object and the information from an area corresponding to the reference image in the read image.

5. The image processing apparatus according to claim 1, wherein the specifying unit generates data for specifying the object to be combined, by using the object stored in the memory, and specifies the object by using the generated data.

6. The image processing apparatus according to claim 1, wherein the extracting unit extracts the object and the information, as an image including both of the object and the information.

7. The image processing apparatus according to claim 1, wherein the print control unit causes the printing apparatus to print, on a sheet, the combined image obtained by combining by the combining unit.

8. The image processing apparatus according to claim 7, further comprising:

a determining unit configured to determine, based on the read image, a size of the sheet on which the combined image is printed, wherein the print control unit causes the printing apparatus to print the combined image according to the size determined by the determining unit.

9. An image processing method comprising:

combining an image stored in a memory, information added by a user on a sheet, and an object printed on the sheet;

causing a printing apparatus to print an object stored in the memory, on a sheet;

inputting a read image obtained by reading the sheet on which the object is printed and information is added by user;

specifying an area, in the input read image, corresponding to the object to be combined, by using the object stored in the memory;

extracting the information from the read image by analyzing the read image, and extracting the object corresponding to the area specified from the read image; and combining the image stored in the memory, the information extracted from the read image, and the object extracted from the read image.

10. A non-transitory computer-readable recording medium having computer-executable instructions stored thereon for causing an image processing apparatus to perform an image processing method, the computer-readable recording medium comprising:

computer-executable instructions for combining an image stored in a memory, information added by a user on a sheet, and an object printed on the sheet;

computer-executable instructions for causing a printing apparatus to print an object stored in the memory, on a sheet;

computer-executable instructions for inputting a read image obtained by reading the sheet on which the object is printed and information is added by user;

computer-executable instructions for specifying an area, in the input read image, corresponding to the object to be combined, by using the object stored in the memory;

computer-executable instructions for extracting the information from the read image by analyzing the read image, and extracting the object corresponding to the area specified from the read image; and computer-executable instructions for combining the image stored in the memory, the extracted from the read image, and the object extracted from the read image.

* * * * *